United States Patent Office 2,832,669
Patented Apr. 29, 1958

2,832,669

PREPARATION OF HYDROGEN FLUORIDE

Donald R. Allen, Lake Jackson, Tex., assignor to The Dow Chemical Company, Midland, Mich., a corporation of Delaware No Drawing. Application February 14, 1957
Serial No. 640,075

12 Claims. (Cl. 23—153)

This invention relates to a process for the preparation of hydrogen fluoride, and more particularly, to a process for the preparation of hydrogen fluoride by the reaction of a metal fluorosilicate with anhydrous hydrogen chloride.

Sodium fluorosilicate and other metal fluorosilicates are readily available and may be easily prepared from fluorspar by the reaction of fluorspar with silicon tetrafluoride and aqueous solution of metal chlorides. These fluorosilicates are also by-products in many industries, for example in the fertilizer industry, and heretofore have had limited utility. A process where the metal fluorosilicates can be used in the preparation of hydrogen fluoride is greatly desirable in not only making possible a profitable utilization of these compounds but also in making available a simple process for the preparation of hydrogen fluoride from fluorspar.

It is known that fluorosilicates will decompose to silicon tetrafluoride and a metallic fluoride when heated in an anhydrous form to a high temperature. It is also known that metallic fluorides will react with anhydrous hydrogen chloride to give hydrogen fluoride. However, the combination of these two steps in a process for the preparation of hydrogen fluoride is not practical. In both of these steps high temperatures and reduced pressures are required and even under these conditions the overall yield of hydrogen fluoride obtained is only in the range of 50 to 55 percent. For example, to decompose sodium fluorosilicate it must be heated to a temperature of 517° C. at an absolute pressure of around 19 mm. of mercury. In the second step, the reaction of the sodium fluoride with hydrogen chloride, reduced pressures have to be used and in the reaction a double salt of sodium fluoride-sodium chloride is formed. This double salt coats the outside of the sodium fluoride particles causing the particles to adhere and prevents the hydrogen chloride from reacting with the sodium fluoride covered with the double salt. Consequently, it is necessary to periodically recrush the solid reactants during the reaction. Although the reactants are often recrushed, part of the sodium fluoride is encased in a double salt and does not react and as a result a yield of hydrogen fluoride obtained is only in the neighborhood of 50 to 55 percent. The low yields and the difficulties encountered in the reaction makes the process commercially unattractive.

It is, therefore, a principal object of this invention to provide a process for the preparation of hydrogen fluoride from a metal fluorosilicate where high yields of hydrogen fluoride can be obtained. Another object is to provide a one step process which does not require the recrushing of solid reactants during the reaction with hydrogen chloride. A further object is to provide a process for the preparation of hydrogen fluoride from a metal fluorosilicate which may be combined with other known reactions and provide an economical method of converting fluorspar to hydrogen fluoride.

It has been discovered that the above and additional objects can be accomplished by contacting a fluorosilicate selected from the group consisting of sodium fluorosilicate, potassium fluorosilicate, lithium fluorosilicate, and calcium fluorosilicate with anhydrous hydrogen chloride at a temperature in the range of 300° C. to the decomposition temperature of the fluorosilicates under the conditions of reaction to react the fluorosilicate with the hydrogen chloride to form hydrogen fluoride, and recovering the hydrogen fluoride formed. By this process yields of hydrogen fluoride of up to 99 percent can be obtained. In the reaction, the fluorosilicate disintegrates so that as the reaction proceeds, unreacted fluorosilicate is continually exposed to the hydrogen chloride. No double salts are formed and thus all of the fluorosilicate can be completely reacted with hydrogen fluoride without the necessity of recrushing or using reduced pressures.

The reaction which occurs may be represented by the following equation:

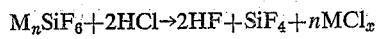

$$M_nSiF_6 + 2HCl \rightarrow 2HF + SiF_4 + nMCl_x$$

where M represents a metal from the group consisting of sodium, potassium, lithium, and calcium, $x$ is the valence of the metal, either 1 or 2, and $n$ is 1 when the metal is calcium and 2 for the other metals.

Although theoretically two moles of hydrogen chloride are required to react with one mole of the fluorosilicate to produce two moles of hydrogen fluoride, generally a slight stoichiometric excess of hydrogen chloride is used. A large excess of hydrogen chloride is not detrimental to the reaction, but since the excess hydrogen chloride will mix with the hydrogen fluoride being formed, its presence hinders the recovery of pure hydrogen fluoride.

The fluorosilicate of sodium, potassium, lithium, and calcium may be used in the preparation of hydrogen fluoride by the above reaction. Sodium fluorosilicate is preferred due to its availability and ease of reaction.

The reaction may be carried out at atmospheric pressure and at a temperature below the decomposition temperature of the fluorosilicate. The optimum reaction temperature used will depend upon the particular fluorosilicate reacted, but for most of the fluorosilicates a temperature above about 300° C. is used. A maximum temperature for the reaction is the decomposition temperature of the specific fluorosilicate at the reaction condition. "Decomposition," as used herein, is intended to mean the dissociation of the fluorosilicate caused by heat without the aid of additional chemicals to cause the breakdown. Preferably temperatures from 350° to 600° C. are employed. While the reaction is operative below 300°, the rate of reaction is slow and thus impractical. The reaction pressure used is not critical and a pressure close to atmospheric is preferred, because it simplifies the equipment required.

The actual reaction of the fluorosilicate with the anhydrous hydrogen chloride is relatively rapid and can be substantially completed in from ½ to 10 minutes. However, since the reaction is between a solid and a gas, the actual contact time employed may be much longer depending upon the efficiency obtained in contacting the solid with the gas. The method used in contacting a solid with a gas and the particle size of the solid determine the rate at which a reaction will proceed. Thus, even though the particle size and the equipment used in the reaction are not critical these factors will determine the optimum contact time required to substantially complete the reaction between the fluorosilicate and hydrogen chloride. With fine particle size and equipment giving good contact, a contact time of less than 10 minutes may be sufficient, while in a laboratory where the reaction is carried out by passing a gas over the surface of the solid in a container, as long as four hours may be required to completely react the fluorosilicate with the hydrogen chloride. When conventional equipment ordinarily used in solid-gas reactions is employed, a granular form of fluorosilicate may generally be used. There is no need to reduce the fluorosilicate to a powder form, since the reaction between the fluorosilicate and the hydrogen chloride is rapid and the particles disintegrate during the reaction.

In the reaction of sodium fluorosilicate with the anhydrous hydrogen chloride, the by-products formed are silicon tetrafluoride and sodium chloride. These by-products may be used to convert fluorspar to sodium fluorosilicate. Thus, by combining these two reactions, it is possible to provide a method for economically producing hydrogen fluoride from fluorspar. To react fluorspar with the by-products, fluorspar is added to a solution of sodium chloride, the resulting slurry is heated to a temperature in the range of 180° to 200° C., and the silicon tetrafluoride passed into the slurry. Sodium fluorosilicate formed remains as a suspension and may be recovered by settling or filtration. After being dried the fluorosilicate can then be reacted with anhydrous hydrogen chloride to obtain hydrogen fluoride and the by-products.

The following examples further illustrate the invention but is not to be construed as limiting:

Example I

A one inch in diameter Monel tube which was wrapped with a resistance heating wire for a distance of 10" was used as a reactor for the reaction of sodium fluorosilicate and hydrogen chloride. Sodium fluorosilicate in an amount of 30 grams was placed in the heated zone of the tube. The heated zone was heated to an average temperature of around 410° C. and anhydrous hydrogen chloride was passed over the surface of the fluorosilicate for a period of four hours. The salt was periodically agitated during the reaction. Since the hydrogen chloride was not preheated before being fed to the reaction zone, the average temperature in the reaction zone was around 380° C.

The hydrogen fluoride in an amount of 5.26 grams was collected and analyzed by the calcium fluoride precipitation method as described in Scott's "Standard Methods of Chemical Analysis." This represented a yield of 82 percent.

Example II

To the Monel tube reactor described in Example I, 10 grams of sodium fluorosilicate was placed in the heated zone of the tube and heated to 516° C. A stream of anhydrous hydrogen chloride was passed over the surface of the hot salt for 30 minutes. During the run the hot salt was periodically agitated.

The reacted mass was analyzed for sodium chloride which indicated that substantially a complete conversion of the sodium fluorosilicate to sodium chloride was obtained.

What is claimed is:

1. A process for the preparation of hydrogen fluoride, which comprises contacting a fluorosilicate selected from the group consisting of sodium fluorosilicate, potassium fluorosilicate, lithium fluorosilicate, and calcium fluorosilicate with anhydrous hydrogen chloride at a temperature in the range of 300° C. to the decomposition temperature of the fluorosilicate under the conditions of reaction to react the fluorosilicate with the hydrogen chloride to form hydrogen fluoride, and recovering the hydrogen fluoride formed.

2. A process according to claim 1 wherein the temperature is in the range of 350° to 600° C.

3. A process for the preparation of hydrogen fluoride, which comprises contacting sodium fluorosilicate with anhydrous hydrogen chloride at a temperature in the range of 300° C. to the decomposition temperature of sodium fluorosilicate under the conditions of reaction to react the fluorosilicate with hydrogen chloride to form hydrogen fluoride, and recovering the hydrogen fluoride formed.

4. A process according to claim 3 wherein the temperature is in the range of 350 to 600° C.

5. A process for the preparation of hydrogen fluoride, which comprises contacting potassium fluorosilicate with anhydrous hydrogen chloride at a temperature in the range of 300° C. to the decomposition temperature of potassium fluorosilicate under the conditions of reaction to react the fluorosilicate with hydrogen chloride to form hydrogen fluoride, and recovering the hydrogen fluoride formed.

6. A process according to claim 5 wherein the temperature is in the range of 350 to 600° C.

7. A process for the preparation of hydrogen fluoride, which comprises contacting lithium fluorosilicate with anhydrous hydrogen chloride at a temperature in the range of 300° C. to the decomposition temperature of lithium fluorosilicate under the conditions of reaction to react the fluorosilicate with hydrogen chloride to form hydrogen fluoride, and recovering the hydrogen fluoride formed.

8. A process according to claim 7 wherein the temperature is in the range of 350° to 600° C.

9. A process for the preparation of hydrogen fluoride, which comprises contacting calcium fluorosilicate with anhydrous hydrogen chloride at a temperature in the range of 300° C. to the decomposition temperature of calcium fluorosilicate under the conditions of reaction to react the fluorosilicate with hydrogen chloride to form hydrogen fluoride, and recovering the hydrogen fluoride formed.

10. A process according to claim 9 wherein the temperature is in the range of 350° to 600° C.

11. A process for preparation of hydrogen fluoride, which comprises intermixing fluorspar with an aqueous sodium chloride solution to form a slurry, contacting the resulting slurry with silicon tetrachloride thereby to react the fluorspar, silicon tetrafluoride, and sodium chloride to form sodium fluorosilicate, recovering the sodium fluorosilicate, contacting the recovered sodium fluorosilicate with anhydrous hydrogen chloride at a temperature in the range of 300° C. to the decomposition temperature of the sodium fluorosilicate under the condition of reaction to react the fluorosilicate with the hydrogen chloride to form hydrogen fluoride, silicon tetrafluoride, and sodium chloride, separating the hydrogen fluoride, and recycling the resulting silicon tetrafluoride and sodium chloride into reaction with additional fluorspar.

12. A process according to claim 11 wherein the temperature is in the range of 350° to 600° C.

No references cited.